3,520,959
PROCESS FOR ELECTROSTATICALLY PINNING EXTRUDED THERMOPLASTIC FILM
Joseph B. Busby, Greenville, S.C., assignor to Celanese Corporation, New York, N.Y., a corporation of Delaware
Filed Mar. 5, 1968, Ser. No. 710,453
Int. Cl. B29d 7/22; H05b 7/00
U.S. Cl. 264—22                    10 Claims

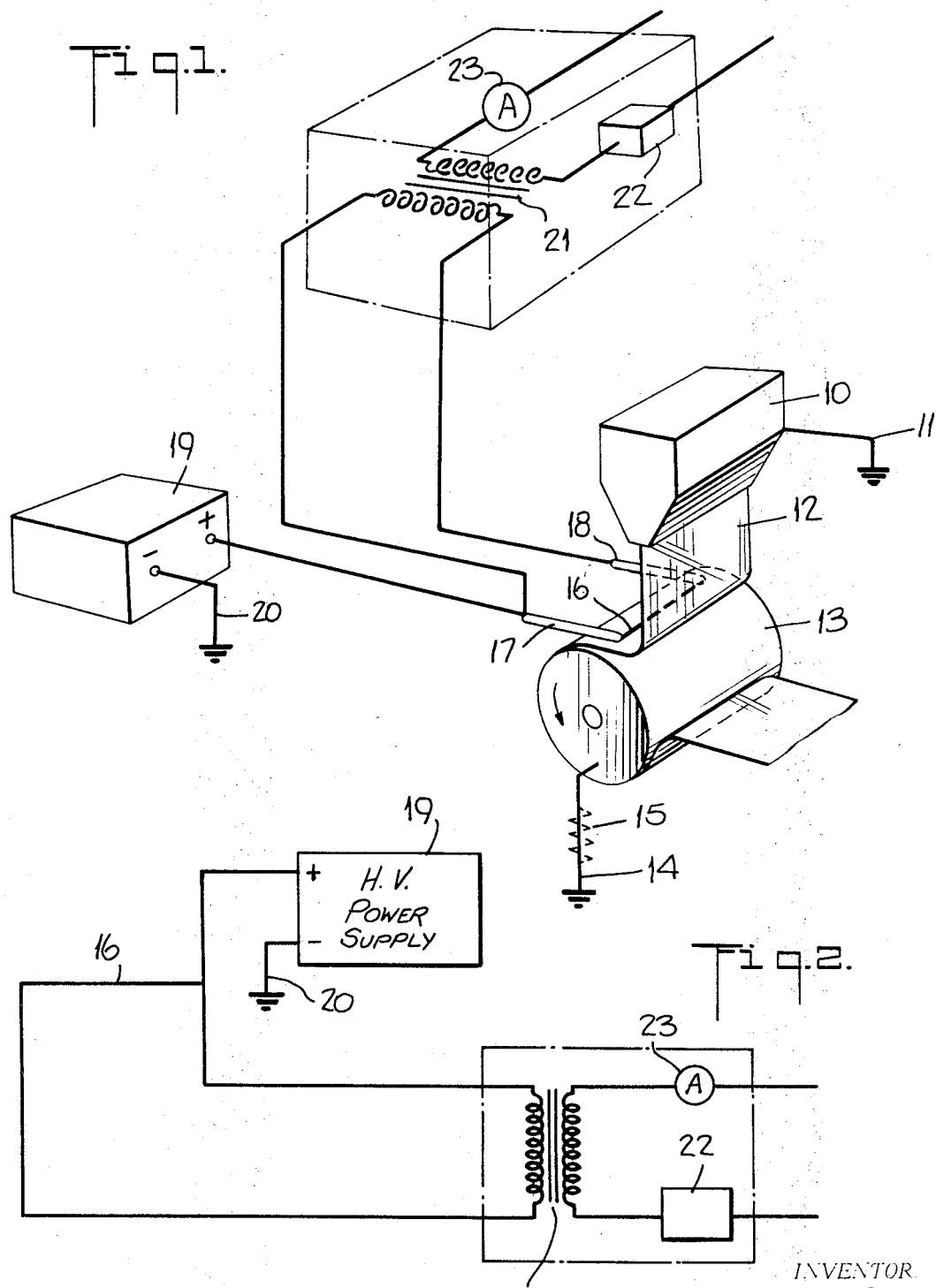

ABSTRACT OF THE DISCLOSURE

In a process wherein a plastic film, e.g., polyethylene terephthalate, is transported on a moving surface, e.g., while being longitudinally or transversely stretched or while being extruded onto a moving quenching surface, and firmly held to this surface by means of an electrostatic charge resulting from a pinning electrode in close proximity to but out of contact with the film, and wherein the plastic generates condensible vapors which collect on the pinning electrode and shorten its useful life, the useful life of the electrode is increased by heating it above the condensation temperature of these vapors.

---

This invention relates to the preparation of thermoplastic polymers in film form. More particularly, this invention relates to the handling of melt extruded thermoplastic organic polymeric films as they are being cast on a moving quenching surface or as they are being transported subsequent to the quenching step.

One common method of handling a long strip of plastic film as it is being transported through various stages of its manufacture is to apply an electrostatic charge to the film as it advances toward moving casting surfaces, rollers, etc., which are usually maintained at a grounded or positive electrical potential. This "electrostatic pinning" chiefly serves to draw the film firmly against the moving surface, although other advantages are often obtained, depending on the stage of the manufacturing process at which the pinning is carried out.

Thus, many commercial processes for preparing plastic films involve the step of extruding molten polymeric material through a suitable extrusion orifice onto a moving quenching surface, i.e., a cooled and generally highly polished drum, a belt, or the like, on which the film is cooled and solidified. When electrostatic pinning is employed during this step, the molten film is generally passed from the extrusion orifice in proximity to but out of contact with at least one electrode which is maintained at a high positive potential relative to ground. The electrostatic field created by the non-uniform voltage gradient at the surface of the electrode causes a limited ionization-discharge in the vicinity of the electrode, which results in the deposit of an electrostatic charge on the film sufficient to electrostatically attract and firmly pin the film to the moving quenching surface. In addition to facilitating the handling of the film during cooling and hardening, the electrostatic attraction of the freshly extruded film against the quenching surface helps to impart desirable surface characteristics to the film.

In common practice electrodes are used which present a uniform and relatively small surface to the film, e.g., a thin wire, one or more "needle probe" (sharp pointed wire) electrodes, a knife edge, or the like, with a single wire generally being preferred.

Prior disclosures of the application of electrostatic pinning to the manufacture of plastic films can be found in U.S. Pat. No. 3,082,735 to Vaccaro, U.S. Reissue application Ser. No. 339,569, filed Dec. 16, 1963 by Vaccaro, and U.S. Pat. 3,427,686, issued on Feb. 18, 1969 to Busby, all of common assignment with the instant application, and U.S. Pat. Nos. 3,068,528 and 3,223,757 to Owens and Owens et al., respectively, all of which are incorporated herein by reference.

This application of electrostatic pinning to the continuous casting of plastic films is not without problems, however, as can be illustrated by particular reference to the production of polyester (and especially polyethylene terephthalate) films.

First and perhaps foremost among such problems is the relatively short in-use life of the pinning electrode. For example, in a typical commercial process for manufacturing 92 gauge 28 inch wide polyethylene terephthalate film, a 6–8 mil stainless steel wire operated at an average potential of about 6.5 kv. had to be changed every 7–8 hours, with each wire change requiring a 15–20 minute shutdown of the entire operation. The economic loss occasioned by these repeated shutdowns is substantial.

The primary reason for this frequent need to replace the pinning wire stems from the fact that the film, and particularly a molten polyester film being extruded from an extrusion orifice, gives off vapors—chiefly decomposed polymer, low molecular weight polymer and free terephthalic acid. In normal operation the temperature of the pinning wire is considerably below the temperature at which these vapors condense. For example, in the case of vapors generated by polyethylene terephthalate, terephthalic acid itself will condense at any temperature below about 200° C., the trimer at about 315° C., and various linear oligomers at temperatures between about 220 and 235° C. Thus, a deposition of the constituents of these vapors occurs on the pinning wire. This buildup of material on the pinning wire in turn causes nonuniform ionization of the air surrounding the pinning wire, which gives rise to what can be termed "bubbles" of air between the film and the casting surface. As the frequency of these bubbles increases, the film undergoes a buildup in surface defects until the point is reached at which the film will not meet quality standards. The pinning wire must then be replaced.

It has now been discovered that these difficulties associated with the conventional methods of electrostatically pinning a plastic film to a moving surface, and particularly a moving quenching surface, can in large measure be overcome by heating the pinning electrode above the condensation temperature of the vapors generated by the plastic being transported. For example, in the typical commercial process for manufacturing 92 gauge 28 inch wide polyethylene terephthalate film mentioned above, heating the pinning wire above the quenching surface to a temperature of 320° C. permitted operation at the same line speed for 36 hours or more before it became necessary to replace the pinning wire.

Aside from the savings resulting from increased operating interval per pinning electrode change, additional benefits are gained by heating the pinning electrode, and it should be noted that these advantages would be obtained even if there were no problem with condensible vapors.

For example, in a conventional quenching operation using an unheated electrode, the voltage on this electrode must be increased if it is desired to increase the charge on the surface of the film. But if the voltage is increased the electrode must be moved further away from the extrusion die or the quenching surface, or both, to avoid increased arcing: moving the electrode, however, increases the degree of neckdown in the film being extruded onto the moving quenching surface, which is also undesirable.

In contrast to this, a heated electrode heats the air in its vicinity. This increases the distance between molecules in the air, allowing electrons being accelerated towards the oppositely charged electrode to have a longer mean free path, thereby increasing their energy level.

At this higher energy level, more ion pairs are produced by collisions between electrons and molecules in the air. Thus, more complete ionization of the air surrounding the electrode is achieved, and it becomes possible to deposit a greater charge on the surface of the film at a given voltage.

More complete ionization of the air surrounding the pinning electrode will also give a lower voltage at which the threshold of pinning occurs, which can be of benefit if arcing problems are encountered when using an electrically grounded moving quenching surface.

It is therefore an object of the present invention to provide an improved process for the preparation of thermoplastic polymers in film form.

It is also an object of the present invention to provide an improved method of handling melt extruded thermoplastic organic polymeric films as they are being cast on a moving quenching surface.

A further object of the present invention is to increase the useful life of pinning electrodes employed in electrostatically pinning melt extruded thermoplastic organic polymeric films, and particularly polyester films, to moving surfaces.

These and other objects of the present invention will be discussed in greater detail hereinbelow, especially with reference to the accompanying drawings, wherein:

FIG. 1 is a schematic perspective view showing an embodiment of the present invention as applied to an electrostatic pinning electrode in use with a moving quenching drum, and FIG. 2 is an effective circuit diagram of the apparatus of FIG. 1.

Referring now to FIG. 1, an extrusion die 10 grounded as shown at 11, is disposed a short distance from a casting drum 13, one to three inches away, for example. The casting drum 13 has a highly polished surface, which can be highly polished chrome steel or other metal, or an insulating surface, e.g., a polyethylene-coated or other plastic-coated surface, and is carried on insulated bearings (not shown). The casting drum 13 may contain the customary cooling liquid system (not shown), and can be rotated at the desired rate by suitable means (also not shown).

The casting drum 13 can be grounded, as shown at 14 when the hypothetical resistor 15, shown in phantom, is not part of the circuit, or it can be operated at an appreciable voltage, e.g., from about 10 v. to about 2 kv. positive relative to ground. As described in the aforementioned copending Busby application, this guards against the possibility of arcing between the pinning electrode 16 and the casting drum 13 when environmental conditions in the vicinity of the pinning electrode 16 change in such a manner that arcing levels would be approached, with consequent damage to the film 12 being cast.

A pinning electrode 16 is disposed a short distance from the film 12, between the extrusion die 10 and the casting drum 13. The pinning electrode 16 is shown as a single wire stretched between a pair of insulated electrode supports 17 and 18, suitably mounted (by means not shown), but the pinning electrode may comprise a single pointed wire, multiple pointed wires, e.g., a pair of pointed wire electrodes suitably mounted near the edges of the film 12 or many pointed wires arranged in a row or rows perpendicular to the view, a knife edge electrode, or the like. The high voltage direct current supply 19 has its positive terminal connected to the pinning electrode 16, and its negative terminal is grounded, as shown at 20.

The high potential, e.g., from about 2 kv. to about 30 kv., on the pinning electrode 16 creates a steep voltage gradient between the electrode and the film 12 and, the air in the vicinity of the electrode being ionized, the positively charged ions in the air transfer a charge to the film 12. When the charged film 12 reaches the casting drum 13, it is electrostatically attracted firmly against the drum and, since the film is relatively soft at this stage, and the casting drum 13 has a highly polished surface, this attraction also serves to give the film a high polish.

When practicing in accordance with the teachings of the present invention, heat can be supplied to the pinning electrode 16 by supplying a voltage across it from the low voltage alternating current supply 21. The voltage supplied will be sufficient to raise the temperature of the pinning electrode 14 above the condensation temperature of any vapors generated by the molten polymer being drawn from the extrusion orifice 10. Thus, for example, in the manufacture fo polyethylene terephthalate film, the pinning electrode will generally be heated to a temperature above about 250° C., and preferably from about 275° C. to about 350° C.

The minimum temperature to which the pinning electrode should be heated when handling any particular polymer can easily be determined by heating the polymer to the temperature at which it will be extruded and then measuring the condensation temperature of whatever vapors are given off. While the heating means shown in FIG. 1 are electrical, any suitable alternative means can be employed. Thus, the pinning electrode can be heated by conduction or convection resulting from heating means other than electrical means, as by circulating a heated liquid through a hollow knife-edge electrode. Similarly, the length, diameter and composition of the pinning electrode in use being known, the voltage required to heat the electrode to the desired temperature can be readily determined in any particular case.

Particular emphasis has been placed hereinabove on the use of a heated pinning electrode in connection with the quenching step. However, anytime a film is warmed during its manufacture, e.g., by friction at its edges while it is being transported or by heating while it is being stretched, exudation of condensible vapors can occur. Thus, it will be recognized by those skilled in the art that heating the pinning electrode can give beneficial results wherever electrostatic pinning is used in the manufacture of plastic film.

In FIG. 2, the high voltage direct current power supply 19 has its positive terminal connected to the pinning electrode 16, and its negative terminal is grounded, as shown at 20. The pinning electrode 16 is connected in series to the output of an isolation transformer 21, which supplies the current needed to heat the pinning electrode 16 to the desired elevated temperature.

On the primary side of the isolation transformer 21, a suitable control means 22, e.g., a silicon-controlled rectifier or a Variac autotransformer, can be employed, if desired (although such control means are not essential), to vary the voltage applied to the isolation transformer 21. This permits the voltage to be varied across the pinning electrode 16 should its length, diameter or composition be changed. An ammeter 23 can also be employed, if desired, on the primary side of the isolation transformer 21 to measure current variations.

Of course, other suitable electrical means besides those shown in FIG. 2 can be employed to heat the pinning electrode 16, and thus it will be understood that the present invention is not limited to the particular circuitry shown.

In order that those skilled in the art can more fully understand the present invention, the following examples are set forth. These examples are given solely for the purpose of illustrating the invention, and should not be considered as expressing limitations unless so set forth in the appended claims.

The first of these examples illustrates a conventional process for preparing 92 gauge 28 inch wide polyester film, i.e., a process wherein an unheated pinning wire is used.

EXAMPLE I

The molten polyethylene terephthalate polymer feed, prepared by transesterification of dimethyl terephthalate and ethylene glycol, and subsequent polymerization, and having an intrinsic viscosity of 0.55–0.67, was extruded from a conventional extrusion die at a temperature of 275° C. and a rate o f1100 lbs./hr. onto a highly polished chrome steel-surfaced casting drum. This drum was maintained at a surface temperature of approximately 25–30° C. by circulating 20° C. cooling water through it, and rotated at a rate of 28 ft./min., which gave a neck-down of approximately ⅞ inch between the film leaving the extruder and the film as cast on the drum.

An 8 mil diameter steel wire, approximately 32 inches long, was tightly stretched ¾ inch below the lips of the extrusion die, ⅝ inch from the surface of the film approaching the casting drum and ⅖ inch from the line at which the extruded film first contacting the casting drum. This pinning wire was connected to the positive terminal of a direct current power supply through a suitably insulated wire. The negative terminal of the direct current power supply and the quenching drum were grounded. A voltage of 6.5 kv. was applied to the pinning wire, which in turn deposited a sufficient charge on the film to tightly pin it to the drum. The film was produced with the required surface characteristics for 8 hours, at the end of which time surface defects increased to the point at which the film became unacceptable. These defects were attributed to the deposits which had accumulated on the pinning wire, which was then replaced.

EXAMPLE II

In this example, the procedure of Example I hereinabove was repeated in every detail but one, namely, the pinning wire was heated to a temperature of 320° C. by passing a current of 1.5 amps. from an isolation transformer through the wire.

Under these conditions, the pinning wire had a useful life of 42 hours before surface defects in the film necessitated its replacement.

It will be obvious to those skilled in the art that other changes and variations can be made in carrying out the present invention without departing from the spirit and scope thereof as defined in the appended claims.

I claim:

1. In a process for the preparation of a film wherein a thermoplastic polymer film is transported on a moving surface and firmly held to said surface by means of an electrostatic charge resulting from an electrode positioned in close proximity to but out of contact with said film, and wherein said polymer generates condensible vapors which collect on said electrode and shorten its useful life, the improvement which comprises maintaining said electrode at an elevated temperature above the condensation temperature of said vapors.

2. A process as described in claim 1 wherein said film is a polyethylene terephthalate film.

3. A process as described in claim 2 wherein said electrode is a wire electrode.

4. A process as described in claim 3 wherein said electrode is heated by means of an electric current.

5. A process as described in claim 1 wherein said film is a molten polyethylene terephthalate film being extruded onto a moving quenching surface.

6. A process as described in claim 5 wherein said moving quenching surface is a casting drum.

7. A process as described in claim 6 wherein said electrode is a wire electrode.

8. A process as described in claim 7 wherein said electrode is heated by means of an electric current.

9. A process as described in claim 7 wherein said electrode is heated to a temperature above about 250° C.

10. A process as described in claim 7 wherein said electrode is heated to a temperature of from about 275° C. to about 350° C.

References Cited

UNITED STATES PATENTS

| | | | |
|---|---|---|---|
| 3,068,528 | 12/1962 | Owens | 264—22 |
| 3,097,056 | 7/1963 | Rowlinson | 264—176 |
| 3,223,757 | 12/1965 | Owens et al. | 264—216 |
| 3,427,686 | 2/1969 | Busby | 264—24 |
| 3,470,274 | 9/1969 | Sandiford et al. | 264—169 |

ROBERT F. WHITE, Primary Examiner

J. R. THURLOW, Assistant Examiner

U.S. Cl. X.R.

18—2, 15; 264—40, 109, 216